J. A. CAREY.
OVEN FOR BAKING PLATES.
APPLICATION FILED DEC. 21, 1920.

1,432,838.  Patented Oct. 24, 1922.

Patented Oct. 24, 1922.

1,432,838

UNITED STATES PATENT OFFICE.

JAMES A. CAREY, OF PITTSBURGH, PENNSYLVANIA.

OVEN FOR BAKING PLATES.

Application filed December 21, 1920. Serial No. 432,359.

*To all whom it may concern:*

Be it known that I, JAMES A. CAREY, a citizen of the United States, residing at Pittsburgh, in the county of Allegheny and State of Pennsylvania, have invented certain new and useful Improvements in Ovens for Baking Plates, of which the following is a specification.

The invention relates to an oven particularly adapted for use by photo-engravers for "baking-in" enamel on metal plates on which a half-tone has been transferred from a photo-graphic negative.

In photo engraving establishments, copper, zinc, or other metal plates are surfaced with a sensitive coating onto which is transferred the reproduction of an object from a photographic negative. The plate, preparatory to its being etched, is enameled or provided with other surfacing capable of resisting an etching solution, the nature of the surfacing being determined by the character of the plate, copper plates usually being enameled, while zinc plates are otherwise treated.

Heretofore, it has been the practice for the engraver to manipulate the plate in the open over a gas flame, with a tong or other device, to bake the enamel or surfacing.

It is the object of the present invention to provide an oven in which the plates may be placed and thoroughly and evenly baked, according to the nature of the work desired. The oven is preferably heated electrically. It thereby overcomes an additional difficulty which has been encountered by engravers, due to shortage of gas in many localities.

Referring to the accompanying drawings, which illustrate my invention,

Figure 1:
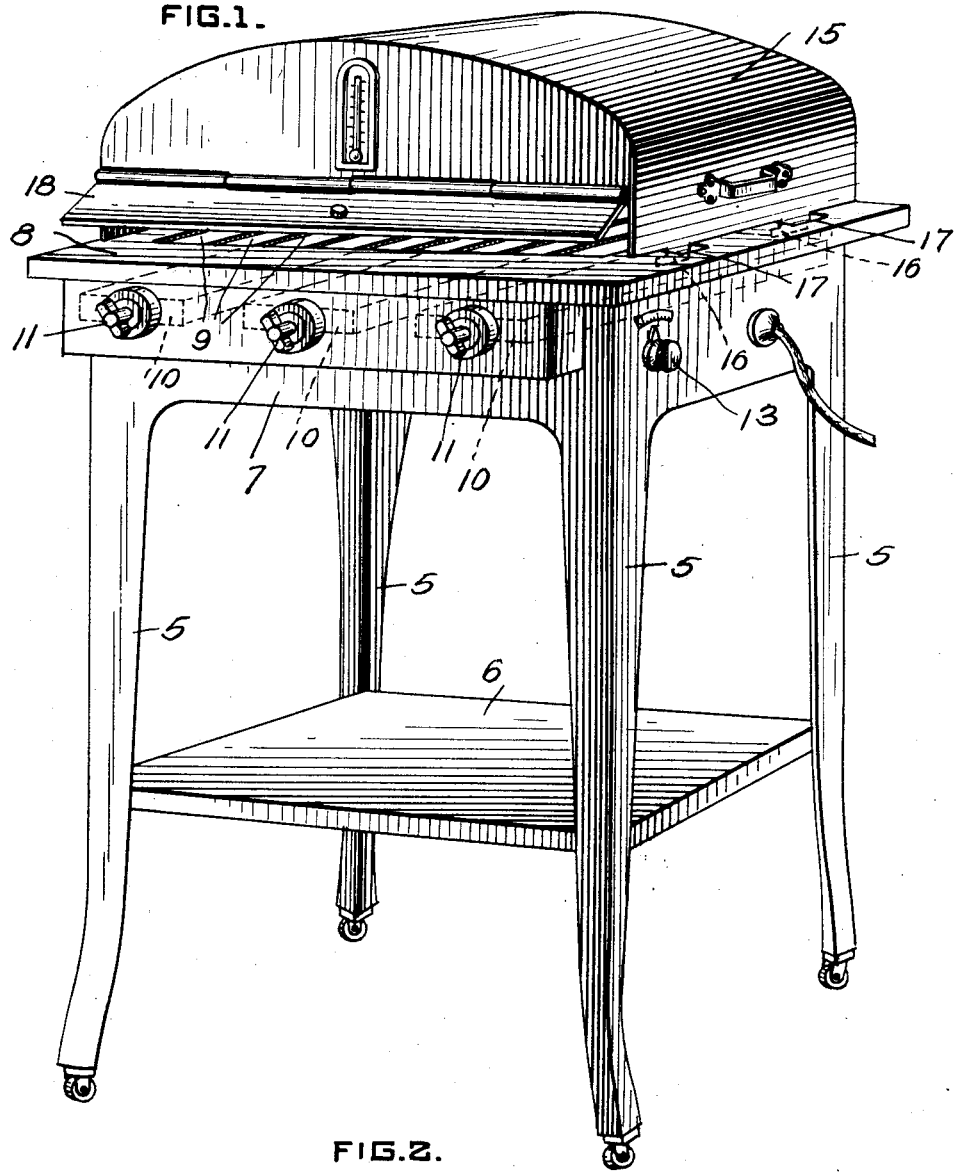
Fig. 1 is a perspective view thereof.
Figure 2:
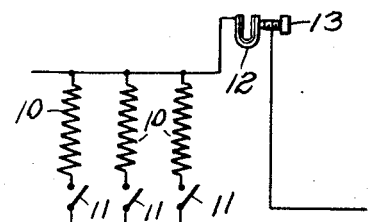
Fig. 2 represents diagrammatically an arrangement of wiring for the electric heating units.

In the drawings, 5 represents legs and 6 a shelf, the legs and shelf forming a supporting frame. Supported by the legs 5 is a table or stove portion 7 having a flat top 8 which has transverse slots 9 in a portion thereof, or is otherwise perforated. Beneath the slotted or perforated portion of the top 8 is a heating means, such as electric heating units 10. They may be manually controlled by switch devices 11 and a thermostat 12 (see Fig. 2) is preferably included in the circuit. The thermostat may be regulated by means of a means 13.

A hood 15 is detachably secured to the top, 8 over the slotted portion therein by means of depending hooks 16 which enter openings 17 in the top. This hood is relatively low, so that only a small oven space to be heated is formed, and therefore permits a high heat to be obtained in the oven space. The hood is formed with a door 18 extending across one side thereof.

In operation, the plates to be baked are slipped beneath the hood while the door 18 is held open. By reason of the door extending across the entire width of one side of the hood, plates of large size can be readily accommodated. The oven will be hot before the plate is inserted, so that it goes immediately into a baking heat. After sufficient baking, the plate may be removed. The plate will, while in the oven, be subjected to uniform heat and will not, therefore, have to be constantly watched by the engraver, and the work is not so hot and tiresome for him.

By the provision of a removable hood, the stove may be used for other purposes when not required for baking plates.

I claim as my invention:

1. An oven for baking plates including a stove having a top, a portion of said top being perforated, a hood over the perforated surface of the top, a door in the hood permitting the insertion and removal of plates therebeneath, and means in the stove beneath the perforated top for supplying heat the area of the perforated surface of the stove being substantially co-extensive with the area covered by the hood.

2. An oven for baking plates including a stove having a top, a portion of said top being perforated, heating means in the stove beneath the perforated top, a removable hood over the perforated surface of the top, means on the hood for securing it to the top, and a door in the hood permitting the insertion and removal of plates therebeneath, the area of the perforated surface of the stove being substantially co-extensive with the area covered by the hood.

3. An oven for baking plates including a stove having a top, a portion of said top being perforated, heating means in the stove beneath the perforated top, a removable hood over the perforated surface of the top, means on the hood for securing it to the top, and a horizontally pivoted door extending across one side of said hood for permitting the insertion and removal of plates therebeneath, the height of the door being considerably less than the height of the oven, the area of said perforated portion of the top being substantially co-extensive with the area covered by the hood.

4. An oven for baking plates including a stove having a substantially flat top, heating units beneath a portion of the top, a removable hood over the heated portion, said hood having a door therein for the insertion of plates, projections on said hood, said top having an opening therein for the reception of said projections to hold the cover in place.

In testimony whereof I affix my signature in presence of two witnesses.

JAMES A. CAREY.

Witnesses:
WM. H. PARMELEE,
LOIS WINEMAN.